US009559935B2

(12) United States Patent
Stokking

(10) Patent No.: US 9,559,935 B2
(45) Date of Patent: Jan. 31, 2017

(54) VIRTUAL INTERFACE APPLICATIONS

(71) Applicants: Koninklijke KPN N.V., The Hague (NL); Nederlandse Organisatie voor Toegepast-Natuurwetenschappelijk Onderzoek TNO, Delft (NL)

(72) Inventor: Hans Maarten Stokking, Wateringen (NL)

(73) Assignees: Koninklijke KPN N.V., The Hague (NL); Nederlandse Organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 14/364,821

(22) PCT Filed: Dec. 13, 2012

(86) PCT No.: PCT/EP2012/075351
§ 371 (c)(1),
(2) Date: Jun. 12, 2014

(87) PCT Pub. No.: WO2013/087752
PCT Pub. Date: Jun. 20, 2013

(65) Prior Publication Data
US 2015/0016280 A1    Jan. 15, 2015

(30) Foreign Application Priority Data
Dec. 14, 2011 (EP) .................... 11193406

(51) Int. Cl.
*H04L 12/26* (2006.01)
*H04L 29/12* (2006.01)
*H04L 12/931* (2013.01)

(52) U.S. Cl.
CPC ............ *H04L 43/50* (2013.01); *H04L 49/351* (2013.01); *H04L 61/2575* (2013.01)

(58) Field of Classification Search
CPC .. H04L 61/2575; H04L 61/2578; H04L 61/25; H04L 61/256; H04L 67/42; H04L 61/2015; H04L 61/2567; H04L 49/351
See application file for complete search history.

(56) References Cited

U.S. PATENT DOCUMENTS 7,933,273 B2    4/2011    Takeda et al.
8,019,889 B1    9/2011    Biswas et al.
(Continued)

FOREIGN PATENT DOCUMENTS

EP    2 056 567 A2    5/2009
EP    2 003 841 B1    8/2010
(Continued)

OTHER PUBLICATIONS

PCT International Search Report and Written Opinion, PCT International Application No. PCT/EP2012/075422, dated Mar. 7, 2013.
(Continued)

*Primary Examiner* — Ayaz Sheikh
*Assistant Examiner* — Debebe Asefa
(74) *Attorney, Agent, or Firm* — McDonnell Boehnen Hulbert & Berghoff LLP

(57) ABSTRACT

The invention relates to a network gateway comprising a gateway function configured to perform one or more predetermined operations on or with respect to data reaching the gateway function, a first application configured to participate in testing of the gateway function by exchanging data with a second application, and a routing unit configured for routing at least some of the data exchanged between the first application and the second application so that the at least some of the data reaches the gateway function. Implementing the first application for testing a particular gateway function on the network gateway having that function, as opposed to implementing the first application in a device in (Continued)

a network communicatively connected to the gateway, eliminates the need to have a device in the network that is available for testing of that function of the gateway.

17 Claims, 5 Drawing Sheets

(56) References Cited

U.S. PATENT DOCUMENTS

| | | | |
|---|---|---|---|
| 2006/0120293 A1 | 6/2006 | Wing | |
| 2006/0182100 A1 | 8/2006 | Li et al. | |
| 2009/0028167 A1 | 1/2009 | Takeda et al. | |
| 2009/0285198 A1* | 11/2009 | Schwartz et al. | 370/352 |
| 2011/0078330 A1 | 3/2011 | Kudo | |
| 2011/0314181 A1 | 12/2011 | Guo | |
| 2012/0044943 A1* | 2/2012 | Hinz et al. | 370/401 |
| 2012/0113977 A1* | 5/2012 | Shimoosawa et al. | 370/352 |

FOREIGN PATENT DOCUMENTS

| | | |
|---|---|---|
| WO | 2009/018004 A1 | 2/2009 |
| WO | 2010/097005 A1 | 9/2010 |
| WO | 2013/087761 A1 | 6/2013 |
| WO | 2013/087779 A1 | 6/2013 |
| WO | 2013087747 A1 | 6/2013 |
| WO | 2013087756 A1 | 6/2013 |
| WO | 2013087786 A1 | 6/2013 |

OTHER PUBLICATIONS

Rosenberg, J. et al., "STUN—Simple Traversal of User Datagram Protocol (UDP) Through Network Address Translators (NATs)", Network Working Group, Request for Comments 3489, Mar. 2003, pp. 1-47.

Rosenberg, J. et al., "Session Traversal Utilities for NAT (STUN)", Network Working Group, Request for Comments 5389, Oct. 2008, pp. 1-51.

MacDonald, D. et al., "NAT Behavior Discovery Using Session Traversal Utilities for NAT (STUN)", Internet Engineering Task Form (IETF), Request for Comments 5780, May 2010, pp. 1-27.

PCT International Search Report and Written Opinion, PCT International Application No. PCT/EP2012/075404, dated Mar. 7, 2013.

Garcia, Jaime et al., "A Broadcasting Enabled Residential Gateway for Next Generation Networks", Broadband Convergence Networks, 2nd IEEE/IFIP International Workshop, May 1, 2007, pp. 1-12.

"Transmission Control Protocol. DARPA Internet Program, Protocol Specification", Request for Comments 793, Sep. 1981, 82 pages.

Callon, R., "The Twelve Networking Truths", Network Working Group, Request for Comments 1925, Apr. 1, 1996, pp. 1-3.

PCT International Search Report and Written Opinion, PCT International Application No. PCT/EP2012/075356, dated Mar. 11, 2013.

Schmitz, Matthew et al., WANIPConnection:1 Service Template Version 1.01 (Chapters 1 and 2), Internet Citation, Nov. 12, 2001, XP002298367, URL:http://web.archive.org/web/20021007022524/http://www.upnp.org/download/ UPnP_IGD_DCP_v1.zip retrieved Sep. 29, 2004, 33 pages.

Prakash, Iyer et al., "Internet Gateway Device:1 Device Template Version 1.01", Internet Citation, Nov. 12, 2001, XP002448341, Retrieved from the Internet: URL:http://web.archive.org/web/20021007022524/http://www.upnp.org/download/UPnP_IGD_DCP_v1.zip retrieved Aug. 24, 2007, 15 pages.

Anonymous: "Home Gateway Technical Requirements: Residential Profile", Internet Citation, Apr. 29, 2008, pp. 1-126, XP002512209, Retrieved from the Internet: URL:http://www.homegatewayinitiative.org/publis/HG1_V1.01_Residential.pdf retrieved Jan. 23, 2009, pp. 1-125.

Broadband Forum: "TR-069 CPE WAN Management Protocol v1.1 Issue 1 Amendment 1", Broadband Forum Technical Report, Issue 1 Amendment 1, Nov. 30, 2006, pp. 1-131.

Anonymous: "Internet Gateway Device (IGD) V 1.0—UPnP Web Site", Nov. 19, 2001, 1 page, XP055030309, Retrieved from Internet: URL:http://web.archive.org/web/20021007022524/http://www.upnp.org/standardizeddcps/igd.asp retrieved Jun. 19, 2012.

Technical Report "DSL Forum TR-098—DSL Home Internet Gateway Device Version 1.1—Data Model for TR-069", Sep. 30, 2005, XP055030317, pp. 1-96.

PCT International Search Report and Written Opinion, PCT International Application No. PCT/EP2012/075351, dated Apr. 5, 2013.

Electronic Communications Committee (ECC): Technical Issues of Establishing Any-to-Any 2-Way Real-Time Communications Over the Internet, Internet Citation, Apr. 24, 2005, XP002420449, Retrieved from Internet: URL: http://web.archive.org/web/20050424081036/http://www.ero.dk/documentation/docs/doc98/official/Word/ECCREP050.doc retrieved on Feb. 16, 2007, pp. 1-19.

Tommasi, Franco et al., "CHARMS: Cooperative Hybrid Architecture for Relaying Multicast Satellite Streams to Sites Without a Satellite Receiver", Wireless Communications, Networking and Information Security (WCNIS), 2010 IEEE International Conference, Jun. 25, 2010, XP031727282, pp. 269-276.

Boulton, C. et al., "NAT Traversal Practices for Client-Server SIP", Internet Engineering Task Force (IETF), Request for Comments 6314, Jul. 22, 2011, pp. 1-60.

PCT International Search Report and Written Opinion, PCT International Application No. PCT/EP2012/075336, dated Mar. 11, 2013.

PCT International Search Report and Written Opinion, PCT International Application No. PCT/EP2012/075365, dated Mar. 14, 2013.

Broadband Forum: "TR-069 CPE WAN Management Protocol v1.1 Issue 1 Amendment 2", Broadband Forum Technical Report, Issue 1 Amendment 2, Dec. 1, 2007, pp. 1-138.

\* cited by examiner

VIRTUAL INTERFACE APPLICATIONS

CROSS REFERENCE TO RELATED APPLICATIONS

The present application is a national stage entry of PCT/EP2012/075351, filed Dec. 13, 2012, and claims priority to EP 11193406.3, filed Dec. 14, 2011. The full disclosures of EP 11193406.3 and PCT/EP2012/075351 are incorporated herein by reference.

FIELD OF THE INVENTION

Generally, the invention relates to the field of data communication. More specifically, the invention relates to network gateways for use between different telecommunications networks.

BACKGROUND OF THE INVENTION

Network gateways are devices adapted for providing an interface or routing functionality between network segments in networks that use different protocols. Typically, network gateways are able to provide network interoperability and routing of data between different networks by including devices, implemented in hardware, in software or in a combination of both, such as basic routing functions, protocol translators, impedance matching devices, rate converters, fault isolators, and signal translators.

At the present time, next to the basic routing function, network gateways often include a variety of auxiliary functions. Some of the auxiliary functions may be network related, such as e.g. a Network Address Translation (NAT) function or a firewall function. Other functions may be more application-level, such as e.g. a parental control function blocking access to certain websites, a spam filter for e-mail applications or a transcoder for media transcoding. Yet other functions could be related to e.g. special routing rules, remote access functionality, and so on. This is schematically illustrated in FIG. 1 showing a network gateway 1 between a network or a network segment 2, such as e.g. a network or a network segment in a Local Area Network (LAN), and a network or a network segment 3, such as e.g. a network or a network segment in a Wide Area Network (WAN). The gateway 1 is illustrated to include not only the basic routing function 4, but also a parental control function 5, a content filter function 6, a NAT function 7, and a firewall function 8.

The different functions such as routing, NAT, firewall, parental control, and content filter all consist of software as well as appropriate software and hardware configuration of a device on which the functions are installed. Once in a while, the software may be updated, software configurations may be changed and/or the hardware configuration may be changed. When this happens, the functions may need to be tested to make sure that they are still working properly. The functions may also need to be tested e.g. once a network gateway is manufactured and before it is shipped out to a customer.

To test the proper working of such functions inside a network gateway, data packets have to be sent from one network to the other via the gateway. In some situations, replies to these packets are required as well in order to carry out proper testing. Therefore, to be able to test a particular function on a gateway, the gateway must be communicatively connected to at least one device in each network. This has several implications.

One implication is that such testing requires active devices on both sides of the gateway, which may not always be the case. For example, an operator changing a content filter setting cannot test the updated filter if there is no device in the home network to test it with.

Another implication is that such testing requires a certain amount of control of the network devices participating in testing. For example, if a user of a computer in a local network wants to test the firewall function of his network gateway for security, he has to send certain Internet Protocol (IP) packets from outside, i.e. from the WAN, to inside, i.e. to his local network. This, in turn, means that the user has to have control over at least one device in the WAN that would be sending such IP packets to his local network.

Yet another implication includes potential additional load on the networks. Not all tests cause significant load. However, if, for example, performance of a firewall function at times when the firewall has to deal with a lot of traffic needs to be tested, a process referred to as a "stress test," then such a test does cause significant load on the networks.

In addition, the above-described testing of gateway functions takes a certain amount of time due to network latencies of the networks on both sides of the gateway.

What is needed is a method for testing different functions on a network gateway in a manner that improves on one or more of the problems described above.

SUMMARY OF THE INVENTION

It is an object of the invention to provide improved methods and systems for testing functions on a network gateway.

According to one aspect of the present invention, a network gateway for use between a first network and a second network is provided. The gateway includes a gateway function configured to perform one or more predetermined operations on or with respect to data reaching the gateway function and a first application configured to participate in testing of the gateway function by exchanging data with a second application. The gateway further includes a routing unit configured for routing at least some of the data exchanged between the first application and the second application so that the at least some of the data reaches the gateway function.

The gateway function could, for example, be a firewall function configured to prevent certain packets sent by a network segment in a first network from reaching network segments in a second network. In such an embodiment, if the firewall functions properly, at least some of the data sent by the network segment in the first network only reaches the firewall function, but does not continue further, to the network segments in the second network.

Alternatively, the gateway function could be a NAT configured to perform network address translation for packets traversing the NAT. In such an embodiment, data sent by a network segment in one network, in this case IP packets, not only reaches the NAT but continues further, to a network segment in the other network.

As used herein, the term "network segment" refers to devices and computing systems within a certain part of a network. For example, in the context of a network gateway, the term "network segment" could encompass devices and computing systems associated with a range of IP-addresses which are part of one subnet. In other words, in this context, a network segment could be considered to be the equivalence of a subnet. In various embodiments, the network segment could include, but is not limited to, e.g. a computer, a server, a hand-held internet browser, an email device, a Voice over IP (VoIP) phone, a game console, or a hand-held gaming device. In a particular case of a network being a LAN, such a network can contain multiple network segments, e.g. a network segment with devices connected to the Internet and a network segment not connected to the Internet, each network segment containing zero or more active devices, sometimes referred to as End User Devices (EUDs).

In one embodiment, the gateway could be adapted to be deployed with a network on one side of the gateway being a LAN and a network on the other side of the gateway being a WAN. For such application, the gateway function of the gateway could be a NAT function configured to allow one or more EUDs in the LAN to communicate with devices in an external network by changing the source address of outgoing requests to that of the gateway and then relaying incoming replies back to the originating EUD. In such an embodiment, the first application could be a so-called "client" application, such as e.g. a STUN client, configured for determining NAT-related information for the NAT function by exchanging one or more messages with the second application, which, in this case, would be a server, such as e.g. a STUN server. In such an embodiment, the testing of the gateway function could include determining one or more of current ports in use by the NAT function, current Wide Area Network Internet Protocol address of the NAT function, current virtual server rules for the NAT function, port mapping behaviour of the NAT function, filtering behaviour of the NAT function, support for hairpinning by the NAT function, one or more of port allocation algorithms implemented in the NAT function, timeout value for NAT binding in the NAT function, and behaviour of the NAT function during congestion, during heavy network traffic, during multiple simultaneous sessions and/or during multiple simultaneous NAT bindings.

While the embodiments such as the one above are described in the present application with reference to a STUN client and a STUN server, analogous teaching may be derived for any client and any server configured to exchange one or more messages for the purpose of testing the NAT function in accordance with some protocol other than the STUN protocol. A person skilled in the art would recognize that the terms "any client" and "any server" in this context could refer to appropriately configured pieces of software on devices.

In various embodiments, the network gateway could be, for example, a NAT, a home gateway, an office gateway, a router, a home or office gateway comprising a router, an edge router on an operator network, or a car gateway. In an embodiment, each of the network gateways described herein could be a computing device, such as a personal computer (PC), or the gateway could be implemented as a part of such a computing device.

The invention is based on the recognition that implementing the first application for testing a particular gateway function on the network gateway having that function, as opposed to implementing the first application in a device in a network communicatively connected to the gateway, eliminates the need to have a device in the network that is available for testing of the function of the gateway. It also eliminates the need for the gateway to be communicatively connected to that network at all, at least for the purpose of testing the gateway function. The invention is further based on the recognition that when the first application is implemented on the network gateway and not in one of the networks, routing of data is necessary so that at least some of the data exchanged between the first and second applications reaches the function being tested. In this manner, the first application appears to be "behind" the function being tested, in the network sense.

In one embodiment, the second application could be included within a network segment in one of the first or second networks between which the network gateway is intended to provide interface and routing functionality. Alternatively, the second application could be included within a network segment of another network, e.g. a network which is only used for the testing of the gateway functions. With either one of these implementations, when the network gateway is available, meaning that the gateway is "online," switched on and connected to at least the network segment hosting the second application, testing of the gateway function may be immediately carried out, as long as the network segment hosting the second application is also available for testing.

In another embodiment, similar to the first application, the second application could also be included within the network gateway. Such an embodiment is particularly advantageous because it allows testing of the gateway function without having to have the network gateway being actually connected to any networks at all. In other words, the network gateway then only needs to be turned on so that the first and second applications could exchange data for testing a particular gateway function and so that the routing unit could route at least some of the data exchanged between these applications for reaching and possibly traversing the gateway function being tested, but the gateway does not need to be "online" or connected to any network segments in any networks. A person skilled in the art will recognize that such functionality does require that the gateway and the routing function on the gateway stay enabled even though no physical network interfaces may be connected, which, in turn, may require specific configuration to this end, depending on the implementation used. This embodiment may be particularly advantageous for automated "offline" testing of gateway functions, e.g. once the gateway is manufactured and before the gateway is shipped out to a customer.

As used herein, the term "offline" in the context of a network gateway being offline, refers to a gateway for which the functionality for testing of the gateway function is not available over the network. This could be the case e.g. when the gateway is simply not connected to any networks, when the gateway is trying to be connected to the networks but no network connections are available, or when network connections are available but testing of the gateway functionality over the network is still not possible, e.g. in case of network congestion or server overload of a server containing the test application.

In the context of the present description, the terms "first application" and "second application" are to be understood broadly to cover not only software applications, but also actual hardware devices or any applications implemented, at least partially, in software, hardware, firmware, or any combination thereof. For example, the first application could comprise STUN client software implemented on the network gateway, while the second application could comprise STUN server, a hardware device.

According to other aspects of the present invention, the present disclosure relates to a computer program with portions, possibly distributed, for performing the various functions described herein and to a data carrier for such software portions.

Hereinafter, embodiments of the invention will be described in further detail. It should be appreciated, however, that these embodiments may not be construed as limiting the scope of protection for the present invention.

DETAILED DESCRIPTION OF THE DRAWINGS

Figure 1:
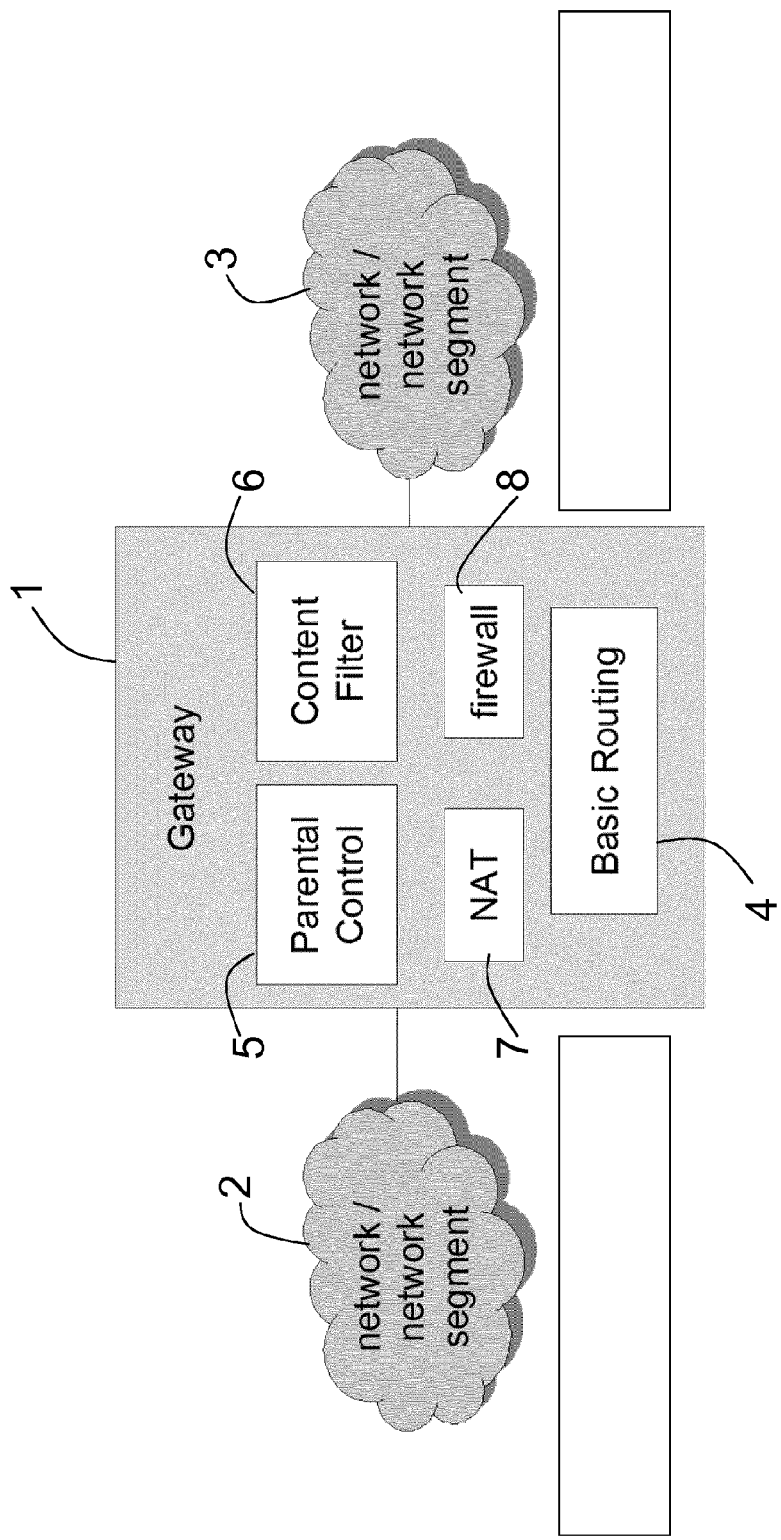
FIG. 1 is a schematic illustration of a network gateway including various functions.
Figure 2:
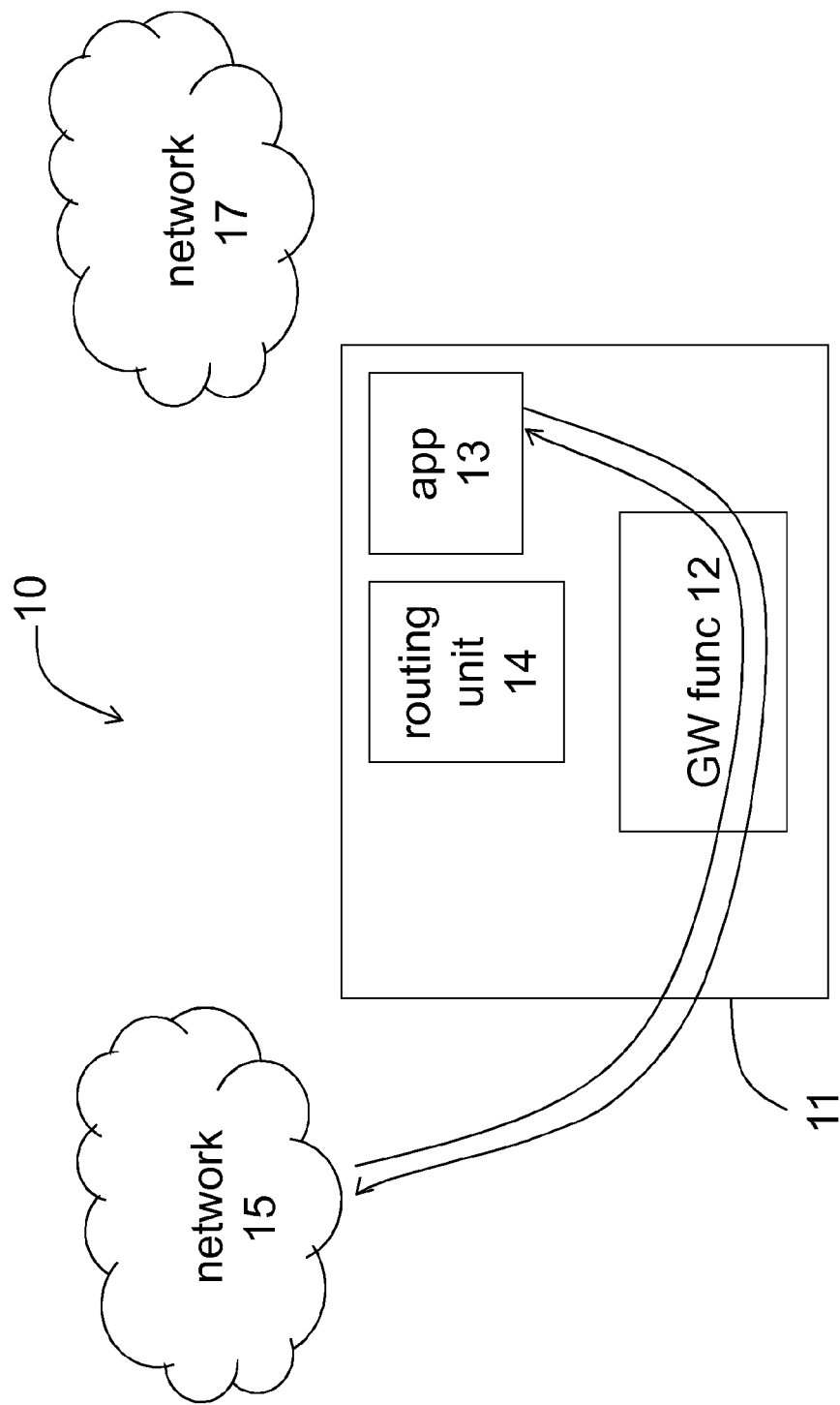
FIG. 2 is a schematic illustration of a computing environment comprising a network gateway for use between two networks, according to one embodiment of the present invention.

FIG. 2 is a schematic illustration of a computing environment 10 comprising a network gateway 11 for use between a network 15 and a network 17, according to one embodiment of the present invention. Each of the networks 15 and 17 could be any networks, such as e.g. IP networks. When connected to the networks 15 and 17, the gateway is adapted to provide an interface and to route data between one or more network segments in the network 15 and one or more network segments in the network 17.

In addition to elements implementing the basic routing functionality of a gateway (those elements not shown in FIG. 2), the gateway 11 includes a gateway function 12, a first application 13, and a routing unit 14.

The gateway function 12 is a device, implemented in software, hardware, firmware, or any combination thereof, adapted for implementing any functionality which does some operations to or with respect to data traffic exchanged between one or more network segments in the network 15 and one or more network segments in the network 17. For example, the gateway function 12 could be a NAT function, a firewall function, or a proxy server.

The first application 13 is an application configured for testing of the gateway function 12 by exchanging data with a second application. In the embodiment illustrated in FIG. 2, the second application is assumed to be within the network 15. However, the teachings described above with respect to the network gateway 11 would still be applicable if the second application was hosted within some other network not shown in FIG. 2.

Consider an embodiment where the network 15 is a WAN IP network and the network 17 is a LAN network comprising one or more EUDs, not shown in FIG. 2, each of which could e.g. be a computer, a hand-held internet browser, an email device, a VoIP phone, a game console, or a hand-held gaming device. Further, consider that the gateway 11 is included within the LAN 17 and that the gateway function 12 is a NAT adapted to enable the EUDs in the LAN 17 to communicate with devices in the WAN by changing the source address of outgoing requests to that of the NAT 12 in the LAN 17 and then relaying incoming replies back to the originating EUD. This means that communication across the NAT 12 is possible only when initiated by a device belonging to the LAN 17. As a result, services that require establishment of a connection initiated by a device from the WAN 15, such as e.g. peer-to-peer (P2P) file sharing, VoIP services, or the online services of video game consoles, fail unless special measures to avoid this failure are taken. Such special measures include various NAT traversal techniques such as e.g. Universal Plug and Play (UPnP), Session Border Controllers (SBCs), and Interactive Connectivity Establishment (ICE). Many of the present NAT traversal techniques require the determination of some type of information regarding the NAT and its behavior, a process that could be referred to as "NAT testing." Typically, the so-called STUN protocol is used for this purpose, in which a communications application, referred to as a "STUN Client," on an EUD behind a NAT exchanges a number of messages with a STUN server in an external network in order to determine behavior of the NAT. However, according to the embodiments of the present invention, the STUN client could be included within the network gateway 11, as the first application 13. In such an embodiment, the second application is the STUN server in the WAN 15. The STUN client and the STUN server then may exchange one or more messages in order to test the NAT 12, where testing of the NAT 12 could e.g. include determining one or more of current ports in use by the NAT 12, current WAN IP address of the NAT 12, current virtual server rules for the NAT 12, port mapping behaviour of the NAT 12, filtering behaviour of the NAT 12, support for hairpinning by the NAT 12, one or more of port allocation algorithms implemented in the NAT 12, timeout value for NAT binding in the NAT 12, and behaviour of the NAT 12 during congestion, during heavy network traffic, during multiple simultaneous sessions and/or during multiple simultaneous NAT bindings.

There are various computer platforms, e.g. OSGi, Linux, and so on, that allow new software such as the first application 13 to be installed in a device like the gateway 11. However, a conventional installation of software on such a gateway will communicate with each network segment with the IP address of the gateway in that network segment. In other words, packets sent and received by such additionally installed software will not reach the special functions of the gateway, such as the gateway function 12. As a result, in a conventional installation of the first application 13 on a network gateway, it would not be possible to test the gateway function 12.

For example, persons skilled in the art will recognize that in order to test a NAT using a STUN client and a STUN server or, more generally, to test a NAT using any "client" and any "server" operating according to some protocol, either STUN protocol or otherwise, the "client" should be "behind" the NAT in that the messages exchanged between the "client" and the "server" should pass through the NAT in the proper direction. If the "client" is the first application 13 implemented on the network gateway 11 in a conventional installation, this condition would not be satisfied as the messages exchanged between such "client" and the "server" would not normally reach the NAT at all.

Similarly, when the gateway function 12 comprises functions other than NAT, such as e.g. a firewall or a parental control filter, in order to be able to carry out proper testing of the gateway function 12 using the first application 13, the first application 13 must be "behind" the gateway function 12 in that the messages exchanged between the first and the second applications should at least reach the gateway function 12 and possibly pass through the gateway function 12 in the proper direction. Similar to the STUN testing described above, in such implementations, this condition is also not satisfied unless special measures are taken. Such special measures comprise inclusion of the routing unit 14 for routing data exchanged between the first and second applications so that at least some of the data exchanged between the first and second applications reaches the gateway function 12.

The routing unit 14 ensures that, for routing purposes, the first application 13 is on the proper side of the gateway function 12. For example, for testing of a firewall, incoming messages need to reach the gateway function 12, e.g. messages coming from a WAN domain and destined for a LAN domain. On the other hand, for testing of a parental control, outgoing messages (requests) may need to reach the gateway function 12, e.g. messages coming from the LAN domain and destined for the WAN domain.

Figure 3:
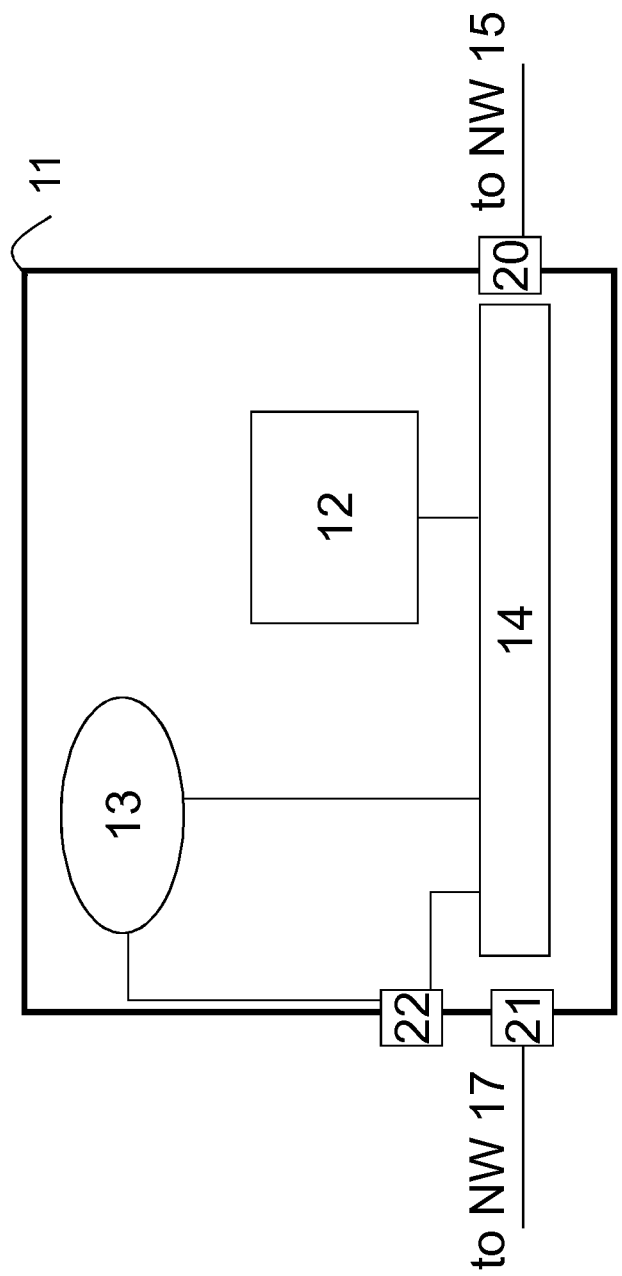
FIG. 3 is a schematic illustration of the network gateway of FIG. 2, according to one embodiment of the present invention.

FIG. 3 provides another view of the network gateway 11 of FIG. 2, according to one embodiment of the present invention. Elements shown in FIG. 3 with the same numerals as in FIG. 2 are intended to illustrate the same elements and, therefore, in the interest of brevity, their description is not repeated here. As shown in FIG. 3, the network gateway 11 includes an interface 20 to the network 15 and an interface 21 to the network 17. The gateway function 12 is configured for performing predetermined operations on or with respect to data traffic coming from the network 17, via the interface 21, and going to the network 15, via the interface 20, and vice versa. In addition, the network gateway 11 comprises a virtual network interface 22 for the first application 13, on the side of the network 17. The virtual network interface 22 is configured to behave like a regular network interface to the routing unit 14, i.e. the virtual network interface 22 allows sending and receiving IP packets and has one or more IP addresses which are reachable through it. The one or more applications reachable via the virtual network interface each have their own unique address, e.g. their own IP address or combination of IP address and port number. However, instead of being a driver for a piece of hardware such as a network interface card, the virtual network interface 22 is a driver which delivers the network traffic to a specific application, in this case the first application 13, e.g. a STUN client described above.

The virtual network interface 22 should be configured as any other interface. To enable proper testing of the gateway function 12, both the interface 22 and the routing rules could be configured similar to the interface 21 or multiple interfaces 21 on the side of the network 17, to make packets travel the correct route to and, possibly, through the gateway function 12. The interface 22 could also be configured to e.g. form a bridge group with the hardware interface on the side of the network 17 (i.e., the interface 21), in which case both the virtual network interface 22 and the interface 21 will use the same routing configuration, and thus packets will travel the correct way.

The routing unit 14 is configured to route messages exchanged between the first application 13 within the network gateway 11 and the second application somewhere outside of the network gateway 11, possibly in the network 15, so that the messages traverse the gateway function 12. Such configuration ensures that the first application 13 is "behind" the gateway function 12 in the network sense since, in a similar way as if the first application 13 was implemented on a network segment connected to the network gateway 11 on the side of the network 17, at least some of the messages exchanged between the first application 13 and the second application are routed via the gateway function 12.

In various embodiments, the routing unit 14 could be implemented in hardware, software, firmware, or any combination of two or more of these.

In one embodiment, the Linux Tun or Tap implementations, currently used for creating Virtual Private Network (VPN) connections, could be used to implement the virtual network interface 22.

In other embodiments, some other virtual network interface implementation could also be used to implement the virtual network interface 22, as long as the routing configuration is programmed in such a way, that the virtual network interface 22 is on the side of the network 17 of the network gateway 11, as described in FIG. 3.

Figure 4:
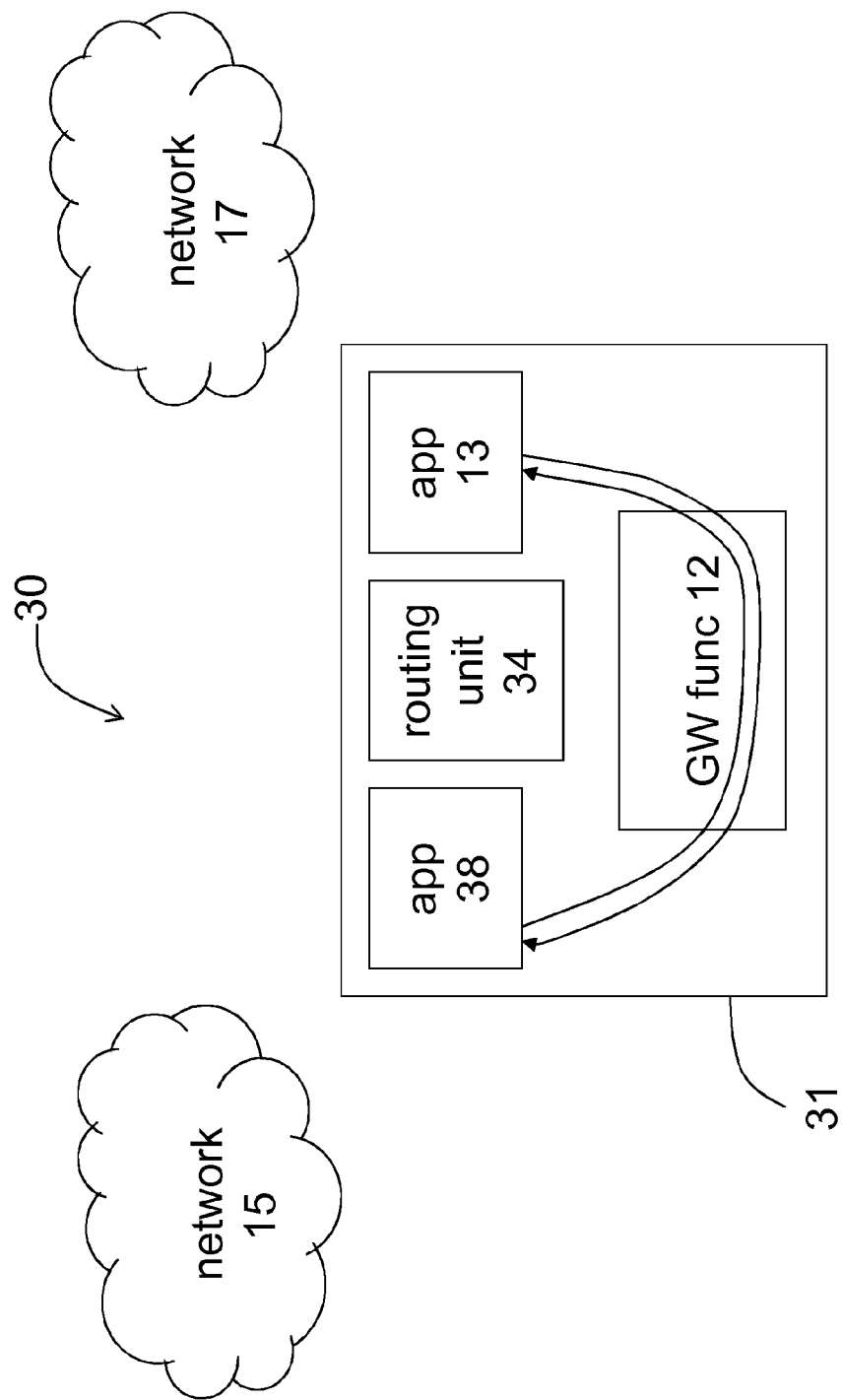
FIG. 4 is a schematic illustration of a computing environment comprising a network gateway for use between two networks, according to another embodiment of the present invention.

Similar to the implementation of the first application 13 on the network gateway 11, the second application for testing the gateway function 12 may also be implemented on the network gateway. FIG. 4 provides a schematic illustration of a computing system 30 where both the first application and the second application are deployed as a part of a network gateway 31. The network gateway 31 is similar to the network gateway 11 in that the gateway 31 comprises the gateway function 12 and the first application 13, described above.

Different from the gateway 11, the gateway 31 also includes a second application 38, where, as described above, the first application 13 and the second application 38 are configured to exchange one or more messages for testing the gateway function 12. Similar to the gateway 11, the gateway 31 also includes a routing unit 34 configured to route at least some of the messages exchanged between the first application 13 and the second application 38 to reach and, possibly, go through the gateway function 12. As with the routing unit 14, in various embodiments, the routing unit 34 could also be implemented in hardware, software, firmware, or any combination of two or more of these.

Figure 5:
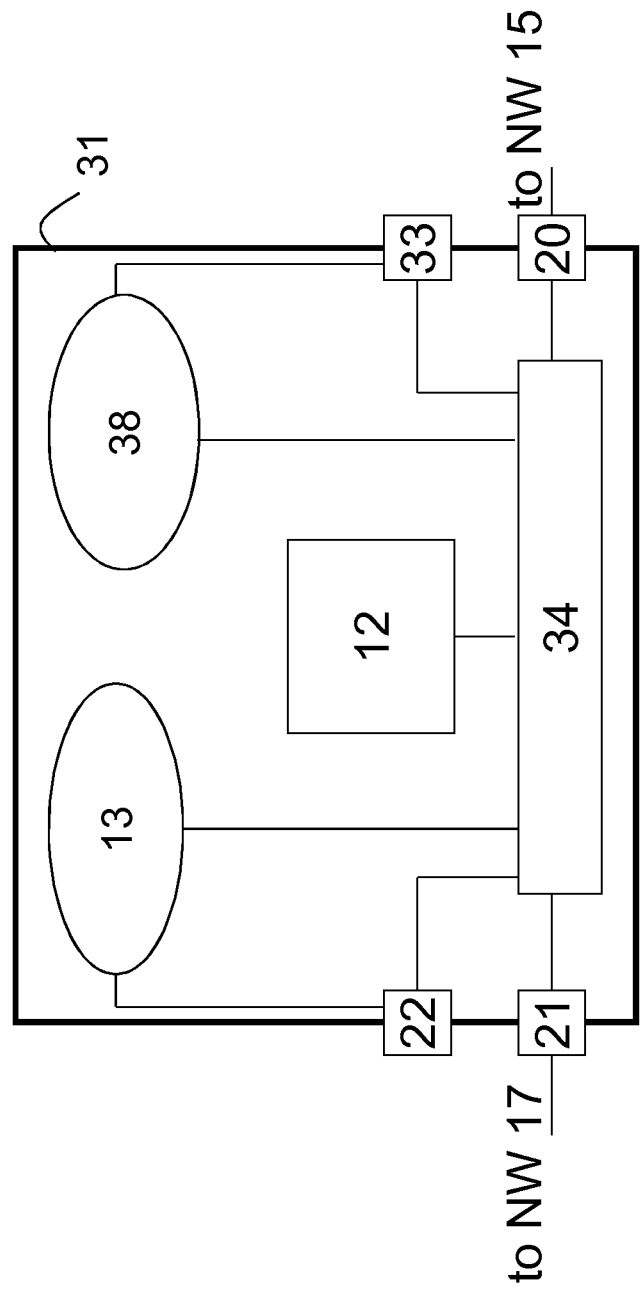
FIG. 5 is a schematic illustration of the network gateway of FIG. 4, according to one embodiment of the present invention.

FIG. 5 provides another view of the network gateway 31 of FIG. 4, according to one embodiment of the present invention. FIG. 5 illustrates the same basic elements as those of FIG. 3, such as e.g. the gateway function 12, the first application 13, the interfaces 20 and 21, and the virtual interface 22. In the interests of brevity, the description of these elements is not repeated here.

As also shown in FIG. 5, the network gateway 31 further includes the second application 38, the routing function 34, and an interface 33. Similar to the virtual network interface 22 shown in FIG. 3, the interface 33 is also a virtual network interface, but on the side of the network 15 of the gateway 31. The virtual network interface 33 includes similar functionality as the interface 22 and is configured in a manner similar to how the interface 22 for the first application 13 shown in FIG. 3 is configured.

When the network 15 comprises a WAN, to use a virtual network interface on the WAN side of a network gateway, an address has to be assigned. This address will typically be a public address, routable in the external network, because these are the addresses normally used on the WAN side of the network gateway. Such public addresses are typically unique because of the routing purpose in the WAN, and are normally assigned only once, i.e. to a single device, at the same time. But, since in the embodiment shown in FIG. 5, the traffic is routed through the gateway function 12 to this address, i.e. does not leave the gateway 31 containing the gateway function 12, the same public address can be used for different implementations of the gateway function at the same time. Note also that since the traffic to the second application 38 on the gateway 31 does not go through the external network, the address assigned to the second application 38 does not have to be a public address. The address can also be a private address, i.e. normally used on the LAN side of the gateway 31, if the gateway 31 can be configured in such a way that traffic originating from the LAN side of the gateway 31 (i.e., the network 17) and destined to such a private address of the second application 38 on the WAN side of the gateway 31 (i.e., the network 15) will indeed at least reach and, possibly, go through the gateway function 12.

To one skilled in the art, it will be obvious that to use such a virtual network interface, the routing rules will have to be configured accordingly. This can be done in various ways, such as creating a bridge group containing the virtual network interface and the actual network interface, or by configuring the routing tables for this specific purpose.

One advantage of implementing both the first and second applications for testing the gateway function on a network gateway is eliminating the need of having devices which are active and able to test the function in two different networks for hosting these applications. As a consequence, automated testing of gateway functions on a gateway can be carried out without needing devices on both sides of the gateway. Also, testing of the gateway functions on a network gateway can be done without any network connections available, i.e. "offline." If connections were available to the network gateway, i.e. the gateway is "online" for performing it's basic interface and routing functionality, these connections would not be burdened with network traffic for the testing, saving the network resources for other purposes.

In addition, implementing both the first and second applications on a network gateway allows speeding up the testing procedure by eliminating or decreasing network latency, since data exchanged between the first and second applications does not have to travel through external networks. For example, including a STUN server and a STUN client in a network gateway comprising a NAT function allows faster determination of the NAT-related information for the NAT function using the STUN protocol because no STUN messages have to travel the WAN side of the network. Even though single network latencies may be very small, for a use such as STUN for NAT testing, many messages may have to travel back and forth between the first and second applications. As a result, the time saved is a multiple of the single network latencies and, thus, might be quite substantial.

Yet further, such a solution is scalable because e.g. each network gateway comprising a NAT may contain a STUN server for use for EUDs in the LAN that is connected to the NAT. The idea of implementing a STUN server on a network gateway is based on recognition that a single network node, such as e.g. a NAT or a home gateway including a NAT, typically has enough processing power to deal with NAT behaviour discovery for the relatively few EUDs that are in the LAN behind such network node. Thus, the implementation of a STUN server on such a network node eliminates the need to for a central server, such as a STUN server, with sufficient capacity to service many individual EUDs behind many different network gateways.

With respect to FIGS. 2-5, each of the network gateways 11 and 31 could further include at least a memory for storing data and computer programs, a processor for running computer programs on and for processing data, particularly for carrying out the tests of the gateway functions. For example, the functionality of the routing units 14 and 34 could be implemented as a computer program stored in the memory for being run on a processor. In addition, each of the network gateways 11 and 31 could further, optionally, include a communications module for sending and receiving messages/data traffic.

Further, while embodiments of the network gateways 11 and 31 were described above with respect to a single set of a first and a second application for testing of a particular single gateway function, similar teachings could be applied to gateways that include more than one particular gateway functions that may need to be tested. For example, a network gateway such as the gateway 31 could include a NAT function and associated first and second applications for testing the NAT function as well as a firewall function and another pair of applications for testing of the firewall function.

Still further, each of the network gateways 11 and 31 could further include means for indicating the outcome of testing of one or more of the gateway functions included in the gateway. In an embodiment, the network gateways 11 and 31 could be provided with a light source or an acoustic source configured to be activated in a particular manner when testing of a particular gateway function is finished. For example, the network gateways 11 and 31 could include a green lamp configured to light up when testing of a particular gateway function is successful and a red lamp configured to light up when testing of a particular gateway function reveals some malfunctioning. Alternatively or additionally, the network gateways 11 and 31 could be provided with a display for displaying a more detailed result of testing and/or be configured to provide the results of testing over the network to other applications. Note that especially for a completely disconnected network gateway 31, local and physical feedback may be relevant. For example, a network gateway whose firewall function can be tested prior to connecting the gateway allows a user to be certain of the offered security before installation of the gateway.

While, in the exemplary embodiments above, the virtual network interface 22 was described to be on the LAN side of the network gateway 11, analogous teachings may be derived for the virtual network interface 22 being on the WAN side of the network gateway. Further, while the exemplary embodiments above were described in the context of IP networks, teachings of the present application may be applied to any kind of networks, not necessarily IP networks.

One embodiment of the invention may be implemented as a program product for use with a computer system. The program(s) of the program product define functions of the embodiments (including the methods described herein) and can be contained on a variety of, preferably non-transitory, computer-readable storage media. Illustrative computer-readable storage media include, but are not limited to: (i) non-writable storage media (e.g., read-only memory devices within a computer such as CDROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored. The computer program may be run on the processing units described herein.

The invention claimed is:
1. A single network gateway device comprising:
a first communication interface configured to connect the single network gateway device to a first network;

a second communication interface configured to connect the single network gateway device to a second network different from the first network;

a gateway function implemented on the single network gateway device, wherein the gateway function is configured to perform one or more predetermined operations on or with respect to at least one of (i) data coming from the first network via the first communication interface and going to the second network or (ii) data coming from the second network via the second communication interface and going to the first network;

a first application implemented on the single network gateway device, wherein the first application is configured to participate in testing of the gateway function by exchanging data with a second application implemented in the first network or in the second network, so as to allow for testing of the gateway function without a test device on one of the first and second networks; and a routing unit configured to route, through the gateway function, at least some of the data exchanged during the testing of the gateway function between the first application implemented on the single network gateway device and the second application implemented on the first network or on the second network, so that the at least some of the data reaches the gateway function.

2. The single network gateway device according to claim 1, wherein at least part of the data reaching the gateway function comprises data communicated between one or more network segments in the first network and one or more network segments in the second network.

3. The single network gateway device according to claim 1, wherein the single network gateway is any one of a home gateway, an office gateway, an edge router on an operator network, or a car gateway.

4. The single network gateway device according to claim 1, wherein the gateway function comprises one or more of a network address translator, a firewall, a content filter, or a parental control.

5. The single network gateway device according to claim 1, wherein when the gateway function comprises a network address translator (NAT), and wherein the testing of the gateway function comprises determining at least one of:
current ports in use by the NAT;
current Wide Area Network Internet Protocol address of the NAT;
current virtual server rules for the NAT;
port mapping behaviour of the NAT;
filtering behaviour of the NAT;
support for hairpinning by the NAT;
one or more of port allocation algorithms implemented in the NAT;
timeout value for NAT binding in the NAT; or
behaviour of the NAT during congestion, during heavy network traffic, during multiple simultaneous sessions and/or during multiple simultaneous NAT bindings.

6. The single network gateway device according to claim 1, wherein the data is routed using at least a first virtual network interface associated with the first application and configured to pass the data via the gateway function.

7. The single network gateway device according to claim 6, wherein the first virtual network interface is a part of a bridge group.

8. The single network gateway device according to claim 6, wherein the first virtual network interface comprises a TUN/TAP virtual interface.

9. The single network gateway device according to claim 1, further comprising means for providing one or more indications of an outcome of the testing of the gateway function.

10. A non-transitory computer-readable medium having instructions store thereon that, when executed by a processor of a single network gateway device, cause the single network gateway device to carry out operations including:

causing a gateway function implemented on the single network gateway device to perform one or more predetermined operations on or with respect to data reaching the gateway function;

causing a first application implemented on the single network gateway device to participate in testing of the gateway function by exchanging data with a second application implemented in a first network or in a second network; and routing at least some of the data exchanged during the testing of the gateway function between the first application implemented on the single network gateway device and the second application implemented on the first network or on the second network, so that the at least some of the data reaches the gateway function.

11. A single network gateway device adapted for routing data between a first network and a second network, the single network gateway device comprising:

a gateway function implemented on the single network gateway device and configured to perform one or more predetermined operations on or with respect to data reaching the gateway function;

a first application implemented on the single network gateway device and configured to participate in testing of the gateway function by exchanging data with a second application; and a routing unit configured to route, through the gateway function, at least some of the data exchanged during the testing of the gateway function between the first application implemented on the single network gateway device and the second application, so that the at least some of the data reaches the gateway function.

12. The single network gateway device of claim 11, wherein the second application is implemented on the single network gateway device.

13. The single network gateway device of claim 12, wherein the data is routed using a virtual network interface associated with the second application and configured to pass the data via the gateway function.

14. The single network gateway device of claim 12, wherein the testing of the gateway function is carried out when the single network gateway device is offline.

15. A method for testing a gateway function implemented on a single network gateway device, wherein the single network gateway device is configured to route data between a first network and a second network, the method comprising:

a first application implemented on the single network gateway device testing the gateway function, wherein testing the gateway function comprises exchanging data with a second application implemented on the first network, the second network, or the single network gateway device;

during the testing of the gateway function, the single network gateway device routing, through the gateway function, at least some of the data exchanged between the first application implemented on the single network gateway device and the second application implemented on the first network, the second network, or the single network gateway device, so that the at least some of the data reaches the gateway function; and based on the testing, the single network gateway device determining whether the gateway function is functioning properly.

16. The method of claim 15, wherein the second application is implemented on the single network gateway device, and wherein the first application implemented on the single network gateway device testing the gateway function comprises testing the gateway function when the single network gateway device is offline with respect to the first and second networks.

17. The method of claim 15, wherein the second application is implemented on the second network, and wherein the first application implemented on the single network gateway device testing the gateway function comprises testing the gateway function when the single network gateway device is connected to the second network but not the first network.

* * * * *